June 4, 1940.  K. W. HALLDEN  2,203,260
FLYING CUTTING DEVICE
Filed Jan. 14, 1939   2 Sheets-Sheet 1

Inventor
Karl W. Hallden
Seymour Earl Nichols
Attorneys

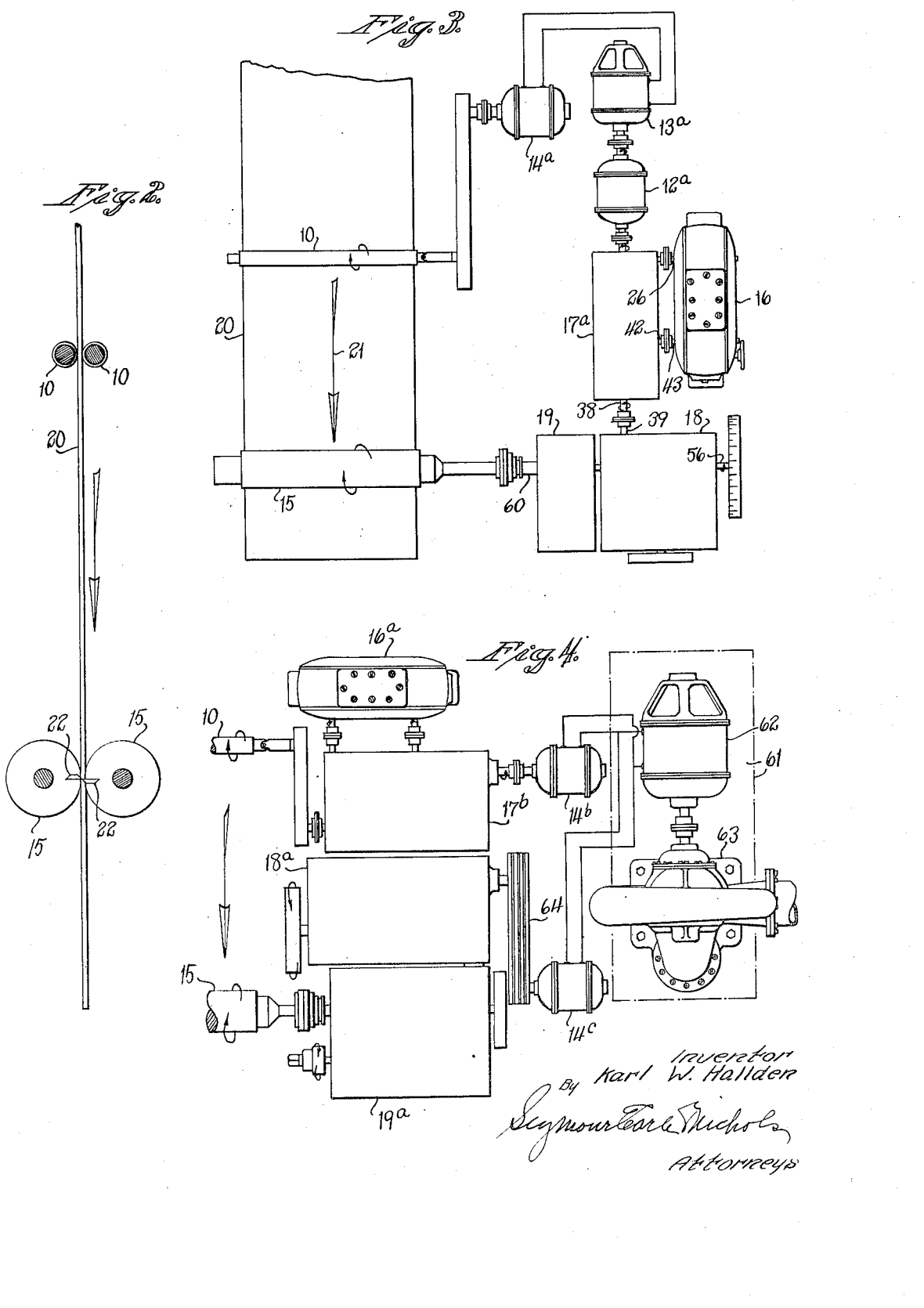

Patented June 4, 1940

2,203,260

UNITED STATES PATENT OFFICE 2,203,260

FLYING CUTTING DEVICE

Karl W. Hallden, Thomaston, Conn.

Application January 14, 1939, Serial No. 250,898

4 Claims. (Cl. 164—68)

This invention relates to improvements in flying cutting devices in which stock, for example, sheet metal, is continuously fed by feed-means to cutter-means which cut the stock into lengths without stopping the feed of the stock, and more particularly relates to flying cutting devices having means for adjusting the relative speed of the feed-means and cutter-means to accomplish different lengths of cut.

One object of this invention is to provide an improved flying cutting device having cutter-means and feed-means with a separate drive motor for each, at least one of the drive motors being a synchronous electric motor and with electric synchronizing means interconnecting both drive motors, and infinitesimally-adjustable means interconnecting the cutter-means and feed-means.

With the above and other objects in view, as will appear to those skilled in the art from the present disclosure, this invention includes all features in the said disclosure which are novel over the prior art.

In the accompanying drawings forming part of the present disclosure, in which certain ways of carrying out the invention are shown for illustrative purposes:

Fig. 2 is a sectional view on line 2—2 of Fig. 1;

Fig. 3 is a view similar to Fig. 1 of a modified form of the invention; and

Fig. 4 is a view similar to Fig. 3 of still another modified form of the invention.

Figure 1:
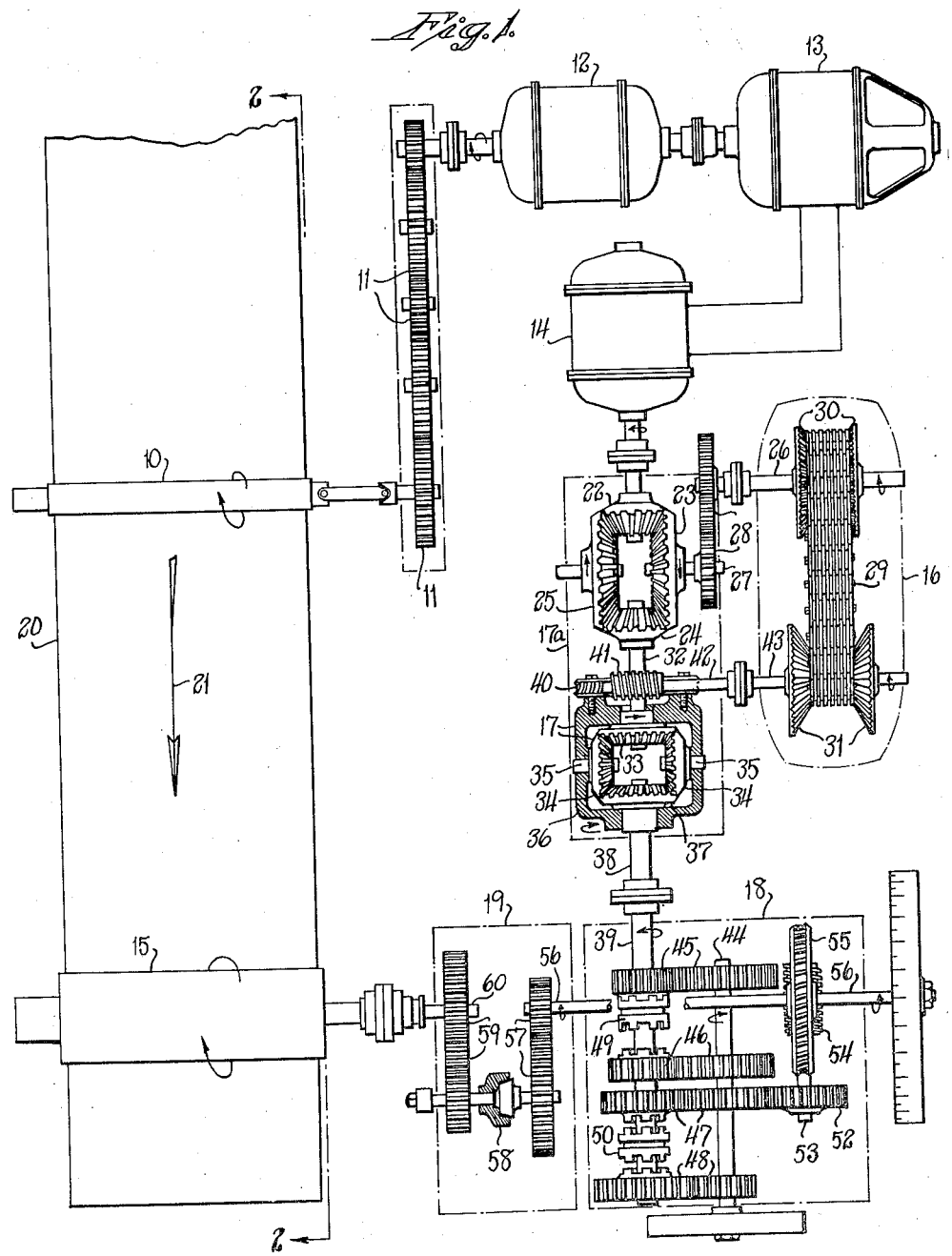
Fig. 1 is a top plan diagrammatic view illustrating one embodiment of the invention.

In the description and claims, the various parts are identified by specified names for convenience, but they are intended to be as generic in their application as the prior art will permit.

Referring to the particular form of the invention illustrated in Figs. 1 and 2 of the drawings, the feed-means in the form of feed-rolls 10 are driven through gearing 11 by drive-means in the form of an electric motor 12, although any other suitable form of drive-means may be used. The gearing 11 drives one of the feed-rolls 10, the two feed-rolls being geared together to rotate at equal speeds in opposite directions in a usual manner. The drive-motor 12 is directly connected to an alternating current generator 13.

A second drive-means in the form of a synchronous electric motor 14 which receives current from the alternating current generator 13 thus maintaining the two motors 12 and 14 in synchronism, drives the cutter-means in the form of cutter-rolls 15, through mechanism including a presettable infinitesimally-adjustable speed-ratio-unit 16, a differential-gear unit 17, a change-gear or step-gear unit 18, and synchronizing means 19. The differential-gear unit 17 is shown in a casing indicated by the broken line 17a.

The particular form of the cutter-means 15 and the synchronizing means 19 forms no part of the present invention and may be of any suitable type. Thus, instead of using the rotary cutter-means 15, any other suitable cutter-means, such for example as one of the well-known reciprocating or rocker type of cutter-means might be employed, and any suitable synchronizing means could also be used, or it could be omitted when good synchronizing is not necessary.

The stock to be cut, which may, for example, be in the form of sheet metal 20, is continuously fed by the feed-rolls 10 to cause the stock 20 to be fed in the direction of the arrow 21 to the cutter-rolls 15, each of which carries a cutter-blade or shear-knife 22. In order to cut the stock 20 into any of various pre-selected lengths desired while the stock continues to be fed through the machine, it is necessary to change the speed of either the feed-rolls 10 or the cutter-rolls 15, or both.

The change-gear unit 18 provides for varying the relative speed between the feed-rolls 10 and the cutter-rolls 15 by a series of relatively-large steps, while the differential-gear unit 17 and infinitesimally-adjustable speed-ratio unit 16 provide means for varying the relative speed between the feed-rolls and cutter-rolls by infinitesimally small adjustments, and by the particular relationship of the units 16 and 17 with the unit 18, as will be more fully explained hereinafter, any desired speed relation between the feed-rolls 10 and cutter-rolls 15 can be obtained.

The synchronous electric motor 14 drives a nest of bevel gears 22, 23, 24 and 25. Gear 23 drives the input shaft 26 of the infinitesimally-adjustable speed-ratio unit through shaft 27 and gears 28. The unit 16 has a special sprocket chain 29 in driving relation between two pairs of conical sprocket wheels 30 and 31, the wheels of each pair of sprocket wheels being adjustable toward and from one another by suitable means, not shown, the particular unit 16 shown, being a commercial device known as the "P. I. V." made by the Link Belt Company of Philadelphia, Pennsylvania. Most of the power transmitted from the synchronous motor 14 to the cutter-rolls 15 is transmitted through the differential-gear unit 17, a minor portion of the power passing through the infinitesimally-adjustable unit 16 which can be set to give, through the worm 41 and worm-gear 40, any desired speed of rotation of the differential-housing 36 within the range provided by the infinitesimal adjustability of the unit 16, to thus act as a control or governor for the differential-gear unit 17 to give any desired speed to the cutter-rolls 15.

The bevel gear 24 is secured to a shaft 32 which has a bevel gear 33 secured to its opposite end, the bevel gear 33 being in driving relation with two sun bevel gears 34 which are pivoted at 35 to the differential-housing 36. The sun gears 34 are in driving relation with a bevel gear 37 secured to the differential output shaft 38 coupled to a shaft 39 of the change-gear unit 18. The differential-gear unit 17 comprises the differential gears 33, 34 and 37 and the differential housing 36.

A worm gear 40 is secured to the differential housing 36 and meshes with a worm 41 carried by or formed on a shaft 42 which is coupled to the output shaft 43 of the unit 16.

The shaft 39 is adapted to drive a shaft 44 through any one of four pairs of selectively-engageable change-gears or step-gears 45, 46, 47 and 48 by suitable actuation of one or the other of the clutch members 49 or 50. The gear secured to the shaft 44 and forming one of the pair of step-gears 47 drives a gear 52 secured to a shaft 53 which has secured thereto a worm 54 which is in driving relation with a worm gear 55 on a shaft 56. The shaft 56 through a first pair of eccentric synchronizing gears 57, a clutch 58, and a second pair of eccentric synchronizing gears 59, drives a shaft 60 which, in turn, drives one of the cutter-rolls 15, the two cutter-rolls being geared together to rotate at equal speeds in opposite directions in a usual manner. The detailed construction of units 16, 17, 18 and 19 and their operations is more fully described in applicant's copending application, Ser. No. 167,-192, filed October 4, 1937.

The pairs of change-gears or step-gears 45, 46, 47 and 48 provide means whereby the speed of rotation of the cutter-rolls 15 can be varied in relatively-large steps to thus correspondingly vary the length of cuts being made from the stock 20 fed therethrough by the feed-rolls 10, and the infinitesimally-adjustable speed-ratio unit 16 in conjunction with the differential-gear unit 17 provides infinitesimally-adjustable means whereby the cutter-rolls 15 can have their speed varied by infinitesimal gradations covering the gaps between the pairs of step-gears 45, 46, 47 and 48. Thus, the step-by-step adjustment of the cutter-rolls 15 and the infinitesimal adjustment of the unit 16 together provide for complete infinitesimal adjustment of the speed ratios between the cutter-means 15 and feed-means 10 over the whole range of the step-gears.

In the form of the invention illustrated in Fig. 3, the construction and operation of the parts is essentially the same as for those illustrated in Fig. 1 and the parts bear corresponding reference numerals except those parts specifically mentioned as having different numerals.

In the construction shown in Fig. 3, the drive-motor 12a drives the cutter-rolls 15 and drives the alternating-current generator 13a which supplies electric current for driving the synchronous electric motor 14a, which in turn drives the feed-rolls 10. Thus, in the Fig. 3 construction, the drive-motor 12a drives the cutter-rolls, whereas in the Fig. 1 construction, the corresponding drive-motor 12 drives the feed-rolls.

In the form of the invention illustrated in Fig. 4 two synchronous electric motors 14b and 14c are maintained in synchronism by driving them from a single alternating current power source 61 which may, for example, be either a central power plant or a special power plant located anywhere in or near the plant employing the flying cutting device of the present invention. The power unit 61 is illustrated in the drawings as having an alternating current generator 62 driven by any suitable motor or prime mover 63, which, in the drawings is illustrated as a turbine.

The mode of driving the feed-rolls 10 and cutter-rolls 15 could be through mechanism arranged exactly the same as shown in Figs. 1 and 3. However, the particular construction illustrated in Fig. 4 is of the form more fully shown and described in my copending application Serial No. 250,897, filed on even date herewith. The motor 14b drives the feed-rolls 10 through the infinitesimally-adjustable speed-ratio unit 16a and a differential-gear unit mounted in a casing 17b. The motor 14c drives the cutter-rolls 15 through belt means 64 and change-gear unit 18a and synchronizing means 19a.

By having the cutter-rolls and feed-rolls driven by separate motors maintained in synchronism by electric synchronizing means including electric wiring, which may be of any length, the two drive-motors can be placed as far apart as desired. Thus, the feed-rolls can be the last set of rolling-mill rolls, if so desired. The electric synchronizing means in the forms of the invention shown in Figs. 1 and 3 includes an alternating current generator driven by one motor and connected by electric wires to the second motor, which is a synchronous electric motor. The electric synchronizing means in the form of the invention shown in Fig. 4 is the electrical wiring connecting the two synchronous motors to a single source of alternating current.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A flying cutting device comprising: cutter-means and a cutter drive-motor therefor; feed-means and a feed drive-motor therefor; at least one of said drive-motors being a synchronous electric motor; electric synchronizing means interconnecting both of said drive-motors and serving to maintain them in synchronism; and precision infinitesimally-adjustable means interconnecting said cutter-means and said feed-means and including, a differential-gear unit having a differential output-shaft, and a pre-settable infinitesimally-adjustable speed-ratio unit having a rotatable connection with said differential-gear unit and adapted to rotate said connection to operatively control the speed of rotation of said differential output-shaft.

2. A flying cutting device comprising: cutter-means and a cutter drive-motor therefor; feed-means and a feed drive-motor therefor; at least one of said drive-motors being a synchronous electric motor; electric synchronizing means interconnecting both of said drive-motors and serving to maintain them in synchronism; and precision infinitesimally-adjustable means interconnecting said cutter-means and said feed-means and including, a differential-gear unit having a differential output-shaft, and a presettable infinitesimally-adjustable speed-ratio unit having a rotatable mechanical-drive connection with said differential-gear unit and adapted to rotate said connection uninterruptedly and at substantially-uniform angular speed at any adjustment of said infinitesimally-adjustable speed-ratio unit to operatively control the speed of rotation of said differential output-shaft.

3. A flying cutting device comprising: cutter-means and a cutter drive-motor therefor; feed-means and a feed drive-motor therefor; at least one of said drive-motors being a synchronous electric motor; electric synchronizing means interconnecting both of said drive-motors and serving to maintain them in synchronism; and precision infinitesimally-adjustable means interconnecting said cutter-means and said feed-means and including, a change-gear unit having a plurality of selectively-engageable pairs of change gears of different speed-ratios differing by relatively-large steps; a differential-gear unit having a differential output-shaft, and a presettable infinitesimally-adjustable speed-ratio unit having a rotatable connection with said differential-gear unit and adapted to rotate said connection to operatively control the speed of rotation of said differential output-shaft and having an infinitesimally-adjustable speed-ratio range at least equal to the speed-ratio range between each two successive speed-ratios provided by said pairs of change-gears and designed and adapted to be set to give and maintain any desired predetermined speed-ratio between each two successive speed-ratios provided by said pairs of change-gears; said change-gear unit, differential-gear unit, infinitesimally-adjustable and speed-ratio unit together forming means designed and adapted to provide a continuous precision infinitesimally-adjustable range of speed-ratios between said cutter-means and said feed-means, over the whole range of steps provided by said pairs of change-gears.

4. A flying cutting device comprising: cutter-means and a cutter drive-motor therefor; feed-means and a feed drive-motor therefor; at least one of said drive-motors being a synchronous electric motor; electric synchronizing means interconnecting both of said drive-motors and serving to maintain them in synchronism; and precision infinitesimally-adjustable means interconnecting said cutter-means and said feed-means and including a change-gear unit having a plurality of selectively-engageable pairs of change gears of different speed-ratios differing by relatively-large steps; a differential-gear unit having a differential output-shaft, and a presettable infinitesimally-adjustable speed-ratio unit having a rotatable mechanical-drive connection with said differential-gear unit and adapted to rotate said connection uninterruptedly and at substantially-uniform angular speed at any adjustment of said infinitesimally-adjustable speed-ratio unit to operatively control the speed of rotation of said differential output-shaft and having an infinitesimally-adjustable speed-ratio range at least equal to the speed-ratio range between each two successive speed-ratios provided by said pairs of change-gears and designed and adapted to be set to give and maintain any desired predetermined speed-ratio between each two succesive speed-ratios provided by said pairs of change-gears; said change-gear unit, differential-gear unit, infinitesimally-adjustable and speed-ratio unit together forming means designed and adapted to provide a continuous precision infinitesimally-adjustable range of speed-ratios between said cutter-means and said feed-means, over the whole range of steps provided by said pairs of change-gears.

KARL W. HALLDEN.